United States Patent
Cox et al.

(10) Patent No.: US 10,414,236 B2
(45) Date of Patent: Sep. 17, 2019

(54) METHODS AND APPARATUS FOR SELECTIVE SPRING PRE-LOAD ADJUSTMENT

(71) Applicant: Fox Factory, Inc., Scotts Valley, CA (US)

(72) Inventors: Christopher Paul Cox, Capitola, CA (US); Michael David Marquez, Santa Cruz, CA (US); Everet Ericksen, Santa Cruz, CA (US)

(73) Assignee: Fox Factory, Inc., Braselton, GA (US)

( * ) Notice: Subject to any disclaimer, the term of this patent is extended or adjusted under 35 U.S.C. 154(b) by 0 days.

(21) Appl. No.: 15/623,914

(22) Filed: Jun. 15, 2017

(65) Prior Publication Data

US 2017/0282669 A1    Oct. 5, 2017

Related U.S. Application Data

(63) Continuation of application No. 14/853,566, filed on Sep. 14, 2015, now Pat. No. 9,682,604, which is a
(Continued)

(51) Int. Cl.
| | |
|---|---|
| *F16F 1/12* | (2006.01) |
| *B60G 17/00* | (2006.01) |
| *F16F 9/32* | (2006.01) |
| *B60G 17/02* | (2006.01) |
| *B60G 15/06* | (2006.01) |

(Continued)

(52) U.S. Cl.
CPC ............ *B60G 17/021* (2013.01); *B60G 11/14* (2013.01); *B60G 15/063* (2013.01); *F16F 1/121* (2013.01); *F16F 9/3264* (2013.01); *F16F 9/56* (2013.01); *B60G 2204/1242* (2013.01); *B60G 2204/61* (2013.01); *B60G 2500/30* (2013.01); *B60G 2600/04* (2013.01); *F16F 2228/08* (2013.01)

(58) Field of Classification Search
CPC ...... B60G 17/00; B60G 17/021; B60G 11/14; B60G 15/063; F16F 1/121; F16F 9/3264
See application file for complete search history.

(56) References Cited

U.S. PATENT DOCUMENTS

| | | |
|---|---|---|
| 435,995 A | 9/1890 | Dunlop |
| 1,923,011 A | 8/1933 | Moulton |

(Continued)

FOREIGN PATENT DOCUMENTS

| | | |
|---|---|---|
| DE | 3738048 A1 | 5/1989 |
| DE | 10326675 A1 | 12/2004 |

(Continued)

OTHER PUBLICATIONS

"European Search Report", European Patent Application No. 14189773.6, dated May 4, 2015, 4 Pages.

(Continued)

*Primary Examiner* — Bradley T King
*Assistant Examiner* — James K Hsiao

(57) ABSTRACT

A method and apparatus for a suspension comprising a spring having a threaded member at a first end for providing axial movement to the spring as the spring is rotated and the threaded member moves relative to a second component. In one embodiment, the system includes a damper for metering fluid through a piston and a rotatable spring member coaxially disposed around the damper and rotatable relative to the damper.

1 Claim, 4 Drawing Sheets

Related U.S. Application Data continuation of application No. 12/727,915, filed on Mar. 19, 2010, now Pat. No. 9,140,325.

(60) Provisional application No. 61/161,620, filed on Mar. 19, 2009, provisional application No. 61/161,552, filed on Mar. 19, 2009.

(51) Int. Cl.
*F16F 9/56* (2006.01)
*B60G 11/14* (2006.01)

(56) References Cited

U.S. PATENT DOCUMENTS

| | | |
|---|---|---|
| 1,948,600 A | 2/1934 | Templeton |
| 2,115,072 A | 4/1938 | Hunt et al. |
| 2,259,437 A | 10/1941 | Dean |
| 2,492,331 A | 12/1949 | Spring |
| 2,540,525 A | 2/1951 | Howarth et al. |
| 2,697,600 A | 12/1954 | Gregoire |
| 2,705,119 A | 3/1955 | Ingwer |
| 2,784,962 A | 3/1957 | Sherburne |
| 2,809,722 A | 10/1957 | Smith |
| 2,879,971 A | 3/1959 | Demay |
| 2,967,065 A | 1/1961 | Schwendner |
| 2,991,804 A | 7/1961 | Merkle |
| 3,071,394 A | 1/1963 | John |
| 3,074,709 A | 1/1963 | Ellis et al. |
| 3,085,530 A | 4/1963 | Williamson |
| 3,087,583 A | 4/1963 | Bruns |
| 3,206,153 A | 9/1965 | Burke |
| 3,284,076 A | 11/1966 | Gibson |
| 3,405,625 A | 10/1968 | Carlson et al. |
| 3,419,849 A | 12/1968 | Anderson et al. |
| 3,528,700 A | 9/1970 | Janu et al. |
| 3,560,033 A | 2/1971 | Barkus |
| 3,575,442 A | 4/1971 | Elliott et al. |
| 3,603,575 A | 9/1971 | Arlasky et al. |
| 3,650,033 A | 3/1972 | Behne et al. |
| 3,701,544 A | 10/1972 | Stankovich |
| 3,784,228 A | 1/1974 | Hoffmann et al. |
| 3,830,482 A | 8/1974 | Norris |
| 4,036,335 A | 7/1977 | Thompson et al. |
| 4,103,881 A | 8/1978 | Simich |
| 4,348,016 A | 9/1982 | Milly |
| 4,366,969 A | 1/1983 | Benya et al. |
| 4,465,299 A | 8/1984 | Stone et al. |
| 4,474,363 A | 10/1984 | Numazawa et al. |
| 4,550,899 A | 11/1985 | Holley |
| 4,630,818 A | 12/1986 | Saarinen |
| 4,634,142 A | 1/1987 | Woods et al. |
| 4,647,068 A | 3/1987 | Asami et al. |
| 4,655,440 A | 4/1987 | Eckert |
| 4,657,280 A | 4/1987 | Ohmori et al. |
| 4,662,616 A | 5/1987 | Hennells |
| 4,732,244 A | 3/1988 | Verkuylen |
| 4,744,444 A | 5/1988 | Gillingham |
| 4,773,671 A | 9/1988 | Inagaki |
| 4,830,395 A | 5/1989 | Foley |
| 4,836,578 A | 6/1989 | Soltis |
| 4,838,527 A | 6/1989 | Holley |
| 4,938,228 A | 7/1990 | Righter |
| 4,949,262 A | 8/1990 | Buma et al. |
| 4,949,989 A | 8/1990 | Kakizaki et al. |
| 4,984,819 A | 1/1991 | Kakizaki et al. |
| 5,027,303 A | 6/1991 | Witte |
| 5,044,614 A | 9/1991 | Rau |
| 5,060,959 A | 10/1991 | Davis et al. |
| 5,074,624 A | 12/1991 | Stauble et al. |
| 5,094,325 A | 3/1992 | Smith |
| 5,105,918 A | 4/1992 | Hagiwara et al. |
| 5,152,547 A | 10/1992 | Davis |
| 5,161,817 A | 11/1992 | Daum et al. |
| 5,203,584 A | 4/1993 | Butsuen et al. |
| 5,236,169 A | 8/1993 | Johnsen et al. |
| 5,265,902 A | 11/1993 | Lewis |
| 5,348,112 A | 9/1994 | Vaillancourt |
| 5,390,949 A | 2/1995 | Naganathan et al. |
| 5,503,258 A | 4/1996 | Clarke et al. |
| 5,542,150 A | 8/1996 | Tu |
| 5,551,674 A | 9/1996 | Johnsen |
| 5,553,836 A | 9/1996 | Ericson |
| 5,592,401 A | 1/1997 | Kramer |
| 5,598,337 A | 1/1997 | Butsuen et al. |
| 5,697,477 A | 12/1997 | Hiramoto et al. |
| 5,722,645 A | 3/1998 | Reitter |
| 5,803,443 A | 9/1998 | Chang |
| 5,816,281 A | 10/1998 | Mixon |
| 5,826,935 A | 10/1998 | Defreitas et al. |
| 5,850,352 A | 12/1998 | Moezzi et al. |
| 5,853,071 A | 12/1998 | Robinson |
| 5,884,921 A | 3/1999 | Katsuda et al. |
| 5,954,318 A | 9/1999 | Kluhsman |
| 5,971,116 A | 10/1999 | Franklin |
| 5,999,868 A | 12/1999 | Beno et al. |
| 6,013,007 A | 1/2000 | Root et al. |
| 6,017,047 A | 1/2000 | Hoose |
| 6,035,979 A | 3/2000 | Foerster |
| 6,058,340 A | 5/2000 | Uchiyama et al. |
| 6,073,736 A | 6/2000 | Franklin |
| 6,105,988 A | 8/2000 | Turner et al. |
| 6,135,434 A | 10/2000 | Marking |
| 6,196,555 B1 | 3/2001 | Gaibler |
| 6,203,026 B1 | 3/2001 | Jones |
| 6,244,398 B1 | 6/2001 | Girvin et al. |
| 6,254,067 B1 | 7/2001 | Yih |
| 6,311,962 B1 | 11/2001 | Marking |
| 6,343,807 B1 | 2/2002 | Rathbun |
| 6,360,857 B1 | 3/2002 | Fox et al. |
| 6,378,816 B1 | 4/2002 | Pfister |
| 6,378,885 B1 | 4/2002 | Ellsworth et al. |
| 6,389,341 B1 | 5/2002 | Davis |
| 6,390,747 B1 | 5/2002 | Commins |
| 6,412,788 B1 | 7/2002 | Ichimaru |
| 6,418,360 B1 | 7/2002 | Spivey et al. |
| 6,427,812 B2 | 8/2002 | Crawley et al. |
| 6,434,460 B1 | 8/2002 | Uchino et al. |
| 6,458,060 B1 | 10/2002 | Watterson et al. |
| 6,501,554 B1 | 12/2002 | Hackney et al. |
| 6,592,136 B2 | 7/2003 | Becker et al. |
| 6,609,686 B2 | 8/2003 | Malizia |
| 6,623,389 B1 | 9/2003 | Campagnolo |
| 6,732,033 B2 | 5/2004 | Laplante et al. |
| 6,837,827 B1 | 1/2005 | Lee et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,902,513 B1 | 6/2005 | McClure et al. |
| 6,905,203 B2 | 6/2005 | Kremers et al. |
| 6,921,351 B1 | 7/2005 | Hickman et al. |
| 6,923,853 B2 | 8/2005 | Kremers et al. |
| 6,935,157 B2 | 8/2005 | Miller |
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,217,224 B2 | 5/2007 | Thomas |
| 7,255,210 B2 | 8/2007 | Larsson et al. |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,306,206 B2 | 12/2007 | Turner |
| 7,316,406 B2 | 1/2008 | Kimura et al. |
| 7,363,129 B1 | 4/2008 | Barnicle et al. |
| 7,374,028 B2 | 5/2008 | Fox |
| 7,397,355 B2 | 7/2008 | Tracy |
| 7,469,910 B2 | 12/2008 | Münster et al. |

(56) References Cited

U.S. PATENT DOCUMENTS

| | | |
|---|---|---|
| 7,484,603 B2 | 2/2009 | Fox |
| 7,490,705 B2 | 2/2009 | Fox |
| 7,566,290 B2 | 7/2009 | Lee et al. |
| 7,581,743 B2 | 9/2009 | Graney et al. |
| 7,631,882 B2 | 12/2009 | Hirao et al. |
| 7,673,936 B2 | 3/2010 | Hsu et al. |
| 7,684,911 B2 | 3/2010 | Seifert et al. |
| 7,694,987 B2 | 4/2010 | McAndrews |
| 7,699,753 B2 | 4/2010 | Daikeler et al. |
| 7,703,585 B2 | 4/2010 | Fox |
| 7,726,042 B2 | 6/2010 | Meschan |
| 7,736,272 B2 | 6/2010 | Martens |
| 7,764,990 B2 | 7/2010 | Martikka et al. |
| 7,766,794 B2 | 8/2010 | Oliver et al. |
| 7,775,128 B2 | 8/2010 | Roessingh et al. |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedetto et al. |
| 7,931,563 B2 | 4/2011 | Shaw et al. |
| 8,016,349 B2 | 9/2011 | Mouri et al. |
| 8,021,270 B2 | 9/2011 | D'eredita |
| 8,042,427 B2 | 10/2011 | Kawakami et al. |
| 8,087,676 B2 | 1/2012 | McIntyre |
| 8,091,910 B2 | 1/2012 | Hara et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,191,964 B2 | 6/2012 | Hsu et al. |
| 8,201,476 B2 | 6/2012 | Tsumiyama |
| 8,210,106 B2 | 7/2012 | Tai et al. |
| 8,246,065 B1 | 8/2012 | Kodama et al. |
| 8,256,732 B1 | 9/2012 | Young et al. |
| 8,262,100 B2 | 9/2012 | Thomas |
| 8,285,447 B2 | 10/2012 | Bennett et al. |
| 8,286,982 B2 | 10/2012 | Plantet et al. |
| 8,292,274 B2 | 10/2012 | Adoline et al. |
| 8,308,124 B2 | 11/2012 | Hsu |
| 8,317,261 B2 | 11/2012 | Walsh et al. |
| 8,328,454 B2 | 12/2012 | McAndrews et al. |
| 8,336,683 B2 | 12/2012 | McAndrews et al. |
| 8,364,389 B2 | 1/2013 | Dorogusker et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,480,064 B2 | 7/2013 | Talavasek |
| 8,550,551 B2 | 10/2013 | Shirai |
| 8,596,663 B2 | 12/2013 | Shirai et al. |
| 8,622,180 B2 | 1/2014 | Wootten et al. |
| 8,641,073 B2 | 2/2014 | Lee et al. |
| 8,655,548 B2 | 2/2014 | Ichida et al. |
| 8,727,947 B2 | 5/2014 | Tagliabue |
| 8,744,699 B2 | 6/2014 | Yamaguchi et al. |
| 8,763,770 B2 | 7/2014 | Marking |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,868,253 B2 | 10/2014 | Hashimoto et al. |
| 8,888,115 B2 | 11/2014 | Chubbuck et al. |
| 8,936,139 B2 | 1/2015 | Franklin et al. |
| 8,950,771 B2 | 2/2015 | Felsl et al. |
| 8,967,343 B2 | 3/2015 | Battlogg et al. |
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,199,690 B2 | 12/2015 | Watarai |
| 9,229,712 B2 | 1/2016 | Takamoto et al. |
| 9,278,598 B2 | 3/2016 | Galasso et al. |
| 9,422,018 B2 | 8/2016 | Pelot et al. |
| 9,523,406 B2 | 12/2016 | Galasso et al. |
| 9,650,094 B2 | 5/2017 | Laird et al. |
| 9,682,604 B2 | 6/2017 | Cox et al. |
| 10,036,443 B2 | 7/2018 | Galasso et al. |
| 10,145,435 B2 | 12/2018 | Galasso et al. |
| 2002/0032508 A1 | 3/2002 | Uchino et al. |
| 2002/0050112 A1 | 5/2002 | Koch et al. |
| 2002/0050518 A1 | 5/2002 | Roustaei |
| 2002/0089107 A1 | 7/2002 | Koh |
| 2002/0113347 A1 | 8/2002 | Robbins et al. |
| 2002/0185581 A1 | 12/2002 | Trask et al. |
| 2002/0187867 A1 | 12/2002 | Ichida et al. |
| 2003/0001358 A1 | 1/2003 | Becker et al. |
| 2003/0040348 A1 | 2/2003 | Martens et al. |
| 2003/0054327 A1 | 3/2003 | Evensen et al. |
| 2003/0065430 A1 | 4/2003 | Lu et al. |
| 2003/0103651 A1 | 6/2003 | Novak |
| 2003/0160369 A1 | 8/2003 | Laplante et al. |
| 2003/0191567 A1 | 10/2003 | Gentilcore |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0103146 A1 | 5/2004 | Park |
| 2004/0208687 A1 | 10/2004 | Sicz et al. |
| 2004/0222056 A1 | 11/2004 | Fox |
| 2004/0256778 A1 | 12/2004 | Verriet |
| 2005/0107216 A1 | 5/2005 | Lee et al. |
| 2005/0110229 A1 | 5/2005 | Kimura et al. |
| 2005/0195094 A1 | 9/2005 | White |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0136173 A1 | 6/2006 | Case et al. |
| 2006/0163787 A1 | 7/2006 | Munster et al. |
| 2006/0175792 A1 | 8/2006 | Sicz et al. |
| 2006/0185951 A1 | 8/2006 | Tanaka |
| 2006/0213082 A1 | 9/2006 | Meschan |
| 2006/0253210 A1 | 11/2006 | Rosenberg |
| 2006/0289258 A1 | 12/2006 | Fox |
| 2007/0006489 A1 | 1/2007 | Case et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0070069 A1 | 3/2007 | Samarasekera et al. |
| 2007/0170688 A1 | 7/2007 | Watson |
| 2007/0213126 A1 | 9/2007 | Deutsch et al. |
| 2007/0239479 A1 | 10/2007 | Arrasvuori et al. |
| 2007/0272458 A1 | 11/2007 | Taniguchi et al. |
| 2008/0009992 A1 | 1/2008 | Izawa et al. |
| 2008/0018065 A1 | 1/2008 | Hirao et al. |
| 2008/0059025 A1 | 3/2008 | Furuichi et al. |
| 2008/0093820 A1 | 4/2008 | McAndrews |
| 2008/0099968 A1 | 5/2008 | Schroeder |
| 2008/0116622 A1 | 5/2008 | Fox |
| 2008/0163718 A1 | 7/2008 | Chiang |
| 2008/0200310 A1 | 8/2008 | Tagliabue |
| 2008/0303320 A1 | 12/2008 | Schranz et al. |
| 2009/0098981 A1 | 4/2009 | Del et al. |
| 2009/0118100 A1 | 5/2009 | Oliver et al. |
| 2009/0121398 A1 | 5/2009 | Inoue |
| 2009/0192673 A1 | 7/2009 | Song et al. |
| 2009/0236807 A1 | 9/2009 | Wootten et al. |
| 2009/0258710 A1 | 10/2009 | Quatrochi et al. |
| 2009/0261542 A1 | 10/2009 | McIntyre |

(56) References Cited

U.S. PATENT DOCUMENTS

| | | |
|---|---|---|
| 2009/0277736 A1 | 11/2009 | McAndrews et al. |
| 2009/0324327 A1 | 12/2009 | McAndrews et al. |
| 2010/0004097 A1 | 1/2010 | D'eredita |
| 2010/0010709 A1 | 1/2010 | Song |
| 2010/0044975 A1 | 2/2010 | Yablon et al. |
| 2010/0133764 A1 | 6/2010 | Greaves |
| 2010/0139442 A1 | 6/2010 | Tsumiyama |
| 2010/0160014 A1 | 6/2010 | Galasso et al. |
| 2010/0186836 A1 | 7/2010 | Yoshihiro et al. |
| 2010/0207351 A1 | 8/2010 | Klieber et al. |
| 2010/0244340 A1 | 9/2010 | Wootten et al. |
| 2010/0252972 A1 | 10/2010 | Cox et al. |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0327542 A1 | 12/2010 | Hara et al. |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0202236 A1 | 8/2011 | Galasso et al. |
| 2011/0204201 A1 | 8/2011 | Kodama et al. |
| 2011/0257848 A1 | 10/2011 | Shirai |
| 2012/0006949 A1 | 1/2012 | Laird et al. |
| 2012/0007327 A1 | 1/2012 | Talavasek |
| 2012/0080279 A1 | 4/2012 | Galasso et al. |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0221713 A1 | 8/2013 | Pelot et al. |
| 2014/0061419 A1 | 3/2014 | Wehage et al. |
| 2015/0197308 A1 | 7/2015 | Butora et al. |
| 2015/0291248 A1 | 10/2015 | Fukao et al. |
| 2016/0185178 A1 | 6/2016 | Galasso et al. |
| 2016/0319899 A1 | 11/2016 | Galasso et al. |
| 2016/0355226 A1 | 12/2016 | Pelot et al. |
| 2018/0222541 A1 | 8/2018 | Madau et al. |
| 2018/0328442 A1 | 11/2018 | Galasso et al. |

FOREIGN PATENT DOCUMENTS

| | | |
|---|---|---|
| DE | 102005025811 A1 | 12/2006 |
| DE | 202010012738 U1 | 12/2010 |
| EP | 304801 A2 | 3/1989 |
| EP | 552568 A1 | 7/1993 |
| EP | 1138530 A2 | 10/2001 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1825220 A2 | 8/2007 |
| EP | 2103512 A2 | 9/2009 |
| EP | 2189191 A2 | 5/2010 |
| EP | 2357098 A2 | 8/2011 |
| EP | 2479095 A2 | 7/2012 |
| EP | 2357098 B1 | 10/2014 |
| JP | 57173632 A | 10/1982 |
| JP | 57173632 U | 11/1982 |
| JP | 57182506 A | 11/1982 |
| JP | 01106721 A | 4/1989 |
| JP | 04-203540 | 7/1992 |
| JP | 05-149364 | 6/1993 |
| JP | 2005119548 A | 5/2005 |
| JP | 2005119549 A | 5/2005 |
| JP | 2007302211 A | 11/2007 |
| JP | 2008238921 A | 10/2008 |
| WO | 98/40231 | 9/1998 |
| WO | 99/06231 | 2/1999 |
| WO | 0027658 A1 | 5/2000 |

OTHER PUBLICATIONS

"European Patent Office Final Decision dated Mar. 21, 2013", European Patent Application No. 10161906.2.

"European Search Report and Written Opinion, European Patent Application No. 13165362.8", dated Sep. 24, 2014, 6 Pages.

"Communication Re Oral Proceedings for European Application No. 10161906, dated Feb. 15, 2013 (Feb. 15, 2013)".

"European Search Report for European Application No. 10161906, 3 pages, dated Sep. 15, 2010 (Sep. 15, 2010)".

"European Search Report for European Application No. 13158034, 4 pages, dated Jun. 28, 2013 (Jun. 28, 2013))".

"European Search Report for European Application No. 15167426, 4 pages, dated Sep. 18, 2015 (Sep. 18, 2015))".

"Office Action for European Application No. 13158034.2, 5 pages, dated May 22, 2014".

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

Fachkunde Fahrradtechnik 4 Auflage, Gressmann_inhaltv und S, 2011, 206-207.

Statement of Grounds of Appeal, EP App. No. 11153607.4, May 28, 2018, 88 Pages.

Grounds of Appeal, EP App. No. 11153607.4, Jun. 1, 2018, 28 Pages.

"European Search Report for European Application No. 11153607, 3 pages, Aug. 10, 2012 (Aug. 10, 2012))".

"European Search Report for EP Application No. 18154672, 3 pages, dated Aug. 28, 2018 (Aug. 28, 2018))".

Healey, "The Tyre as Part of the Suspension System", The Institution of Automobile Engineers, Nov. 1924, 26-128.

Kasprzak, "Understanding Your Dampers: A guide from Jim Kasprzak", http://www.kaztechnologies.com/downloads/kaz-tech-tips/ Accessed: Oct. 24, 2018, 25 pages.

Litchfield, "Pneumatic Tires", Transactions (Society of Automobile Engineers), vol. 8, Part II, 1913, 208-223.

Nilsson, "Opposition Letter Against EP-2357098", Oct. 13, 2017, 7.

Puhn, "How to Make Your Car Handle", HPBooks, 1981, 7 Pages.

Thum, "Oppostion Letter Against EP2357098", Oct. 16, 2018, 39.

Waechter, et al., "A Multibody Model for the Simulation of Bicycle Suspension Systems", Vehicle System Dynamics, vol. 37, No. 1, 2002, 3-28.

U.S. Appl. No. 61/175,422, filed May 4, 2009, Mario Galasso et al., 17 Pages.

U.S. Appl. No. 61/302,070, filed Feb. 5, 2010, Mario Galasso et al., 39 Pages.

"17 Years of Innovation and Still Evolving", https://www.powertap.com/post/blog-15-17-years-of-innovation-and-still-evolving, Nov. 28, 2018, 8 Pages.

"ANT Message Protocol and Usage", Dynastream Innovations, Inc., Jul. 2, 2007, 68 Pages.

"Basis for Claims Filed 23.01.15", European Patent Application No. 14189773.6, 2 Pages.

Thum, Notice of Opposition to a European Patent, EP App. No. 14189773.6, Dec. 13, 2018, 49 Pages.

METHODS AND APPARATUS FOR SELECTIVE SPRING PRE-LOAD ADJUSTMENT

CROSS-REFERENCE TO RELATED APPLICATIONS

This application claims priority to and is a continuation of the co-pending patent application, U.S. patent application Ser. No. 14/853,566, filed on Sep. 14, 2015, entitled "METHODS AND APPARATUS FOR SELECTIVE SPRING PRE-LOAD ADJUSTMENT", by Christopher Paul Cox et al., and assigned to the assignee of the present invention, the disclosure of which is hereby incorporated herein by reference in its entirety.

The application Ser. No. 14/853,566 claims priority to and is a continuation of the patent application, U.S. patent application Ser. No. 12/727,915, filed on Mar. 19, 2010, now U.S. Pat. No. 9,140,325, entitled "METHODS AND APPARATUS FOR SELECTIVE SPRING PRE-LOAD ADJUSTMENT", by Christopher Paul Cox et al., and assigned to the assignee of the present invention, the disclosure of which is hereby incorporated herein by reference in its entirety.

The U.S. patent application Ser. No. 12/727,915 claims priority to and benefit of U.S. Provisional Patent Application No. 61/161,620, filed on Mar. 19, 2009, entitled "METHODS AND APPARATUS FOR SELECTIVE SPRING PRE-LOAD ADJUSTMENT" by Christopher Paul Cox et al., which is incorporated herein, in its entirety, by reference.

The U.S. patent application Ser. No. 12/727,915 claims priority to and benefit of U.S. Provisional Patent Application No. 61/161,552, filed on Mar. 19, 2009, entitled "METHODS AND APPARATUS FOR SELECTIVE SPRING PRE-LOAD ADJUSTMENT" by Christopher Paul Cox et al., which is incorporated herein, in its entirety, by reference.

BACKGROUND OF THE INVENTION

Field of the Invention

Embodiments of the present invention generally relate to a user-adjustable spring for use in a shock absorber.

Description of the Related Art

Integrated damper/spring vehicle shock absorbers often include a damper body surrounded by a mechanical spring. The damper often consists of a piston and shaft telescopically mounted in a fluid filled cylinder. The mechanical spring may be a helically wound spring that surrounds the damper body. Various integrated shock absorber configurations are described in U.S. Pat. Nos. 5,044,614; 5,803,443; 5,553,836; and 7,293,764; each of which is herein incorporated, in its entirety, by reference.

The spring mechanism of many shock absorbers is adjustable so that it can be preset to varying initial states of compression. In that way the shock absorber can be adjusted to accommodate heavier or lighter carried weight, or greater or lesser anticipated impact loads. In motorcycle racing, particularly off-road racing, shock absorbers may be adjusted according to certain rider preferences.

U.S. Pat. No. 5,044,614 ("the '614 patent") shows a damper body carrying a thread 42. A helical spring 18 surrounds the damper body where the two form an integrated shock absorber. The compression in the helical spring 18 may be pre-set by means of a nut 48 and a lock nut 50. Because the nut 48 and lock nut 50 must be relatively torqued to prevent nut 50 rotation upon final adjustment, the shock absorber must typically be removed from its vehicle in order to allow torquing wrench access. Once the spring 18 is in a desired state of compression, lock nut 50 is rotated, using a wrench, up against nut 48 and tightened in a binding relation therewith.

The system described in the '614 patent requires that the user be able to access a large amount of the circumference of the shock absorber, and specifically the nut 48 and lock nut 50, with a wrench (e.g. col. 4, lines 15-17). Unfortunately many shock absorbers, as mounted on a corresponding vehicle, are fairly inaccessible, and have limited surrounding wrench space because of other surrounding vehicle hardware and/or, as in the instant case, a separate damping fluid reservoir or "piggyback." What is needed is a shock absorber having a spring that can be readily adjusted while the shock absorber is mounted on a vehicle. What is needed is a motorcycle "monoshock" having a spring that can be easily adjusted without removing the shock from the motorcycle. What is needed is a shock absorber having a spring where the state of spring adjustment is constantly indicated and easily visible while the shock is mounted on a vehicle.

SUMMARY

The present invention generally relates to a suspension comprising a spring assembly having a threaded member at a first end for imposing axial movement in the spring as the spring is rotated and thereby rotating the threaded member relative to a second component. In one embodiment, the system includes a damper for metering damping fluid and a rotatable spring member coaxially disposed around the damper and rotatable relative to the damper. In one embodiment an adjustment assembly includes a spring adjustment nut (e.g. follower nut) and clamp with the adjustment nut disposed on a threaded portion of the second component. When the clamp is loosened, the adjustment or "follower" nut rotates with the spring which is rotated by a user and the rotation thereby compresses or decompresses the spring as the nut moves axially (by thread pitch) along the threaded second component. In one embodiment, the clamp includes an indicator that cooperates with markings on the second component to indicate the compression state of the spring.

BRIEF DESCRIPTION OF THE DRAWINGS

So that the manner in which the above recited features of the present invention can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
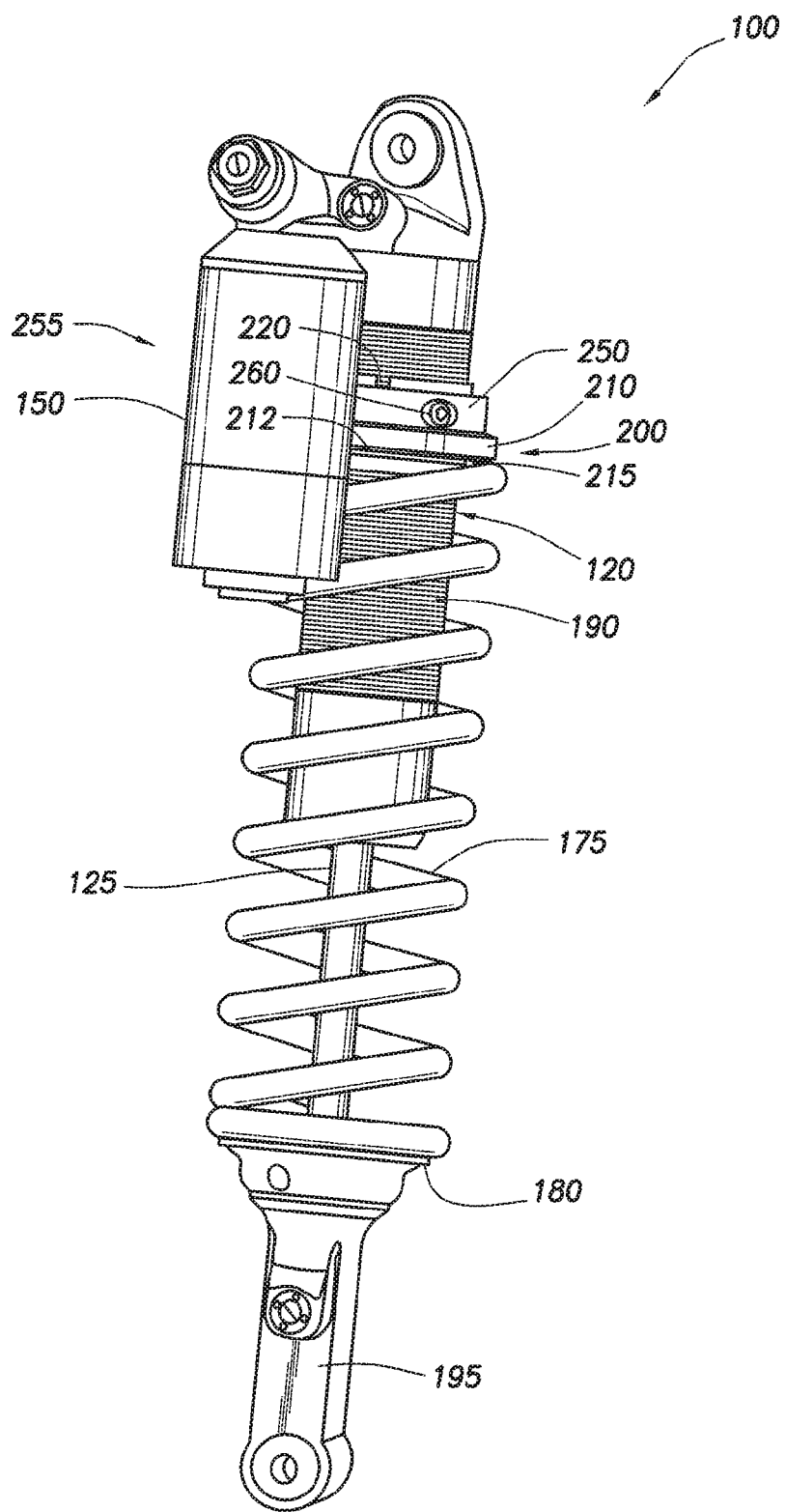
FIG. 1 is a perspective view of a shock absorber having a user-adjustable spring.

FIG. 1 shows an embodiment of a reservoir type shock absorber 100. The shock absorber includes a second component, such as in this embodiment a damper body 120, with a rod 125 extending therefrom and a reservoir 150 is in fluid (e.g. damping fluid such as hydraulic oil) communication with the damper body 120. The shock further includes a helical spring 175 annularly disposed about the damper body 120 and captured axially between a bottom clip 180 at a lower end and an adjuster assembly 200 at an upper end. An outer surface of the damper body 120 includes threads 190 that facilitate rotation of nut 210 and corresponding axial movement of the adjuster assembly 200 relative to the body 120.

One embodiment of the adjuster assembly 200 is best appreciated with reference to all of the Figures and comprises a follower nut 210 and a clamp 250. In one embodiment the follower nut 210 includes a pin 215 for fitting into a hole 216 (shown in FIG. 2) in a flange of the nut 210. Referring to FIG. 3, the pin 215 rotationally indexes the follower nut 210 to the spring 175 at an interface 300 between an abrupt end 470 of the wound wire and an upwardly inclined upper surface of the same wound wire in the coil preceding (i.e. directly underneath) the abrupt end 470 of the helical spring 175. In one embodiment, pin 215 extends axially (i.e. parallel to the longitudinal axis of the shock absorber 100) downward from follower nut 210 and extends into the interface space 300. Due to interference between the pin 215 and the abrupt end 470 of spring 175 in one direction (referring to FIG. 3) and the helical angle of the spring wire in the other direction where the end and the angle combined form an axial recess at an upper end of the spring 175, rotation of the spring 175 will interfere with the pin (or key or tooth) 215 and impart a rotational force (via the pin 215) to the follower nut 210. Conversely, rotation of the follower nut 210 will carry the pin 215 and a rotational force will be correspondingly transmitted to the spring 175. In one embodiment (not shown) an upper portion of the spring 175 adjacent the abrupt end 470 is tapered to increase the surface contact between the spring and a lower end of the follower nut 210 (i.e. the spring end is ground "flat"). In one embodiment (not shown) the flattened last coil portion of the upper end of the spring includes an axial hole drilled therein for receiving the portion of pin 215 that protrudes from hole 216. In one embodiment the upper end of the spring is castellated and the lower surface 212 of the nut 210 is castellated such that the castellations of the nut and the spring are interengageable for rotationally fixing the nut 210 to the spring 175. In one embodiment, the nut 210 includes a ratcheting pawl set on a lower surface thereof and the spring includes suitable beveled one way castellations on an upper surface thereof (or vice versa) and the spring and the nut are therefore rotationally engaged in one rotational direction only (depending on the sense of the ratchet set) and relatively freely rotatable in the other rotational direction. In one embodiment, the spring 175 is rotatable in relation to the bottom clip 180. In another embodiment the bottom clip 180 is bearing-mounted (e.g. with a race of ball bearings disposed between a lower end of the spring and an upward facing surface of the bottom clip 180 in axially abutting relation to each) to a shock mount 195 and thereby facilitates easier rotation of the spring 175 relative to the damper body 120 (by reducing the relative apparent coefficient of friction between the bottom clip and the lower end of the spring). In one embodiment, the spring comprises a plurality of springs axially abutted one with another where each of the springs has a different spring rate. In one embodiment, at least one spring of a shock absorber is wound having a compound spring rate. It is worth noting that as the spring 175 is placed in greater states of compression, the friction force between the spring 175 and its axial abutments at the clip 180 and the follower nut 210 are increased.

While the follower nut 210 is a separate component in some embodiments, it will be understood that the nut can be integral with the spring 175 whereby one end of the spring is therefore effectively threaded to the damper housing and axially adjustable upon rotation of the spring while an opposite end of the spring is axially fixed but rotationally movable relative to the damper body. In one embodiment, the clamp member can also be formed to simply include a threaded member, for instance, that interacts with the damper body to prevent rotation between the threads of the integral spring/nut/clamp and the threaded damper body. In one embodiment, the bottom portion 180 includes a cylindrical member, or body, (not shown) axially and upwardly disposed within and along the spring 175. In one embodiment the cylindrical member is threaded along an axial exterior length thereof. In one embodiment an adjustment assembly 200 is located between bottom clip or annular "lip" 180 and a lower end of the spring 175. Much as has been previously described in relation to threads 190 and the nut 210, in one embodiment the threads 211 on an inner diameter of nut 210 are engaged with threads on an outer diameter of the cylindrical member (not shown). The pin 215 engages a recess 300 at a lower end of the spring 175. As previously described, rotation of the spring 175 correspondingly rotates the nut 210, via pin 215, and the nut 210 translates axially along the cylindrical member thereby increasing or decreasing the compression in the spring 175 depending on the direction of rotation and the directional "sense" of the threads. In one embodiment the cylindrical member (not shown) has an inner diameter that is larger than the outer dimensions of the spring and is disposed axially upward along the shock and outside of the spring. A nut is threaded on an outer diameter thereof and engaged with an end of the spring and the cylinder is threaded on an inner diameter thereof and the nut, cylinder and spring cooperate as principally described herein to facilitate adjustment of compression in the spring. In one embodiment the spring includes an assembly 200 and corresponding threaded sections (e.g. 190, cylindrical member) at each of its ends. In one embodiment the threads at each end are opposite in "sense" so that rotation of the spring increases or decreases compression in the spring twice as fast as a single threaded end version. In one embodiment threads at one end are of a different pitch than threads at the other end of the spring 175.

Figure 2A:
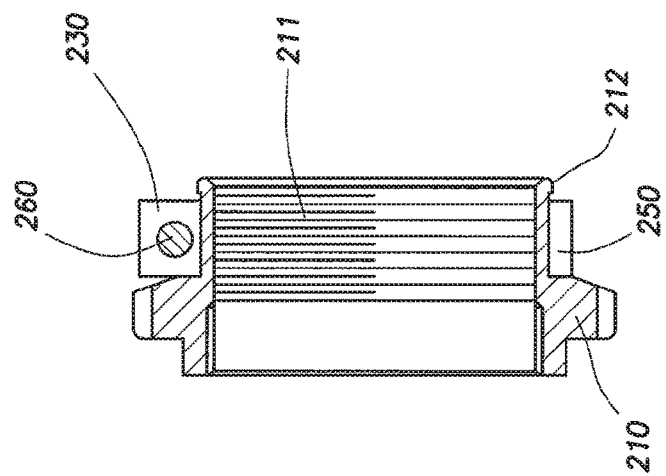
FIG. 2 is an exploded view of a follower nut and clamp, and 2A is a section view thereof.
Figure 2:
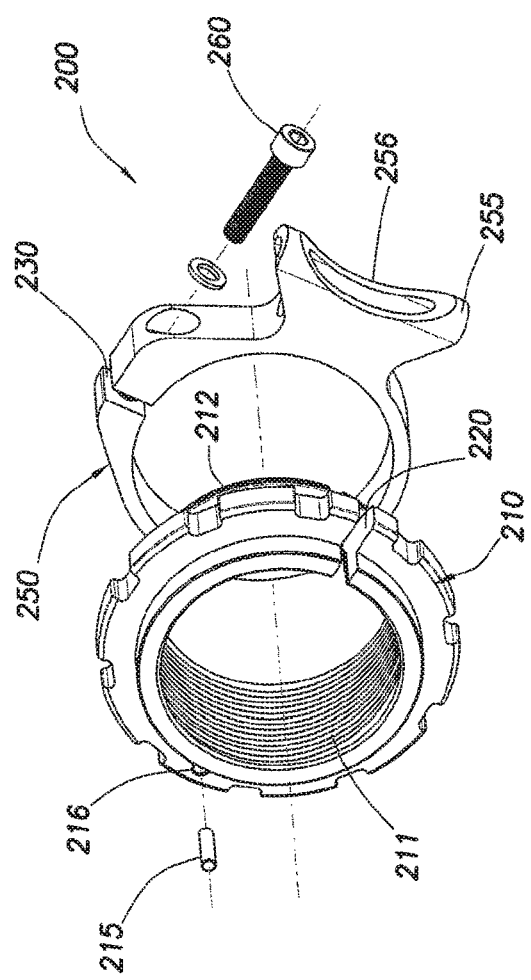
Figure 3:
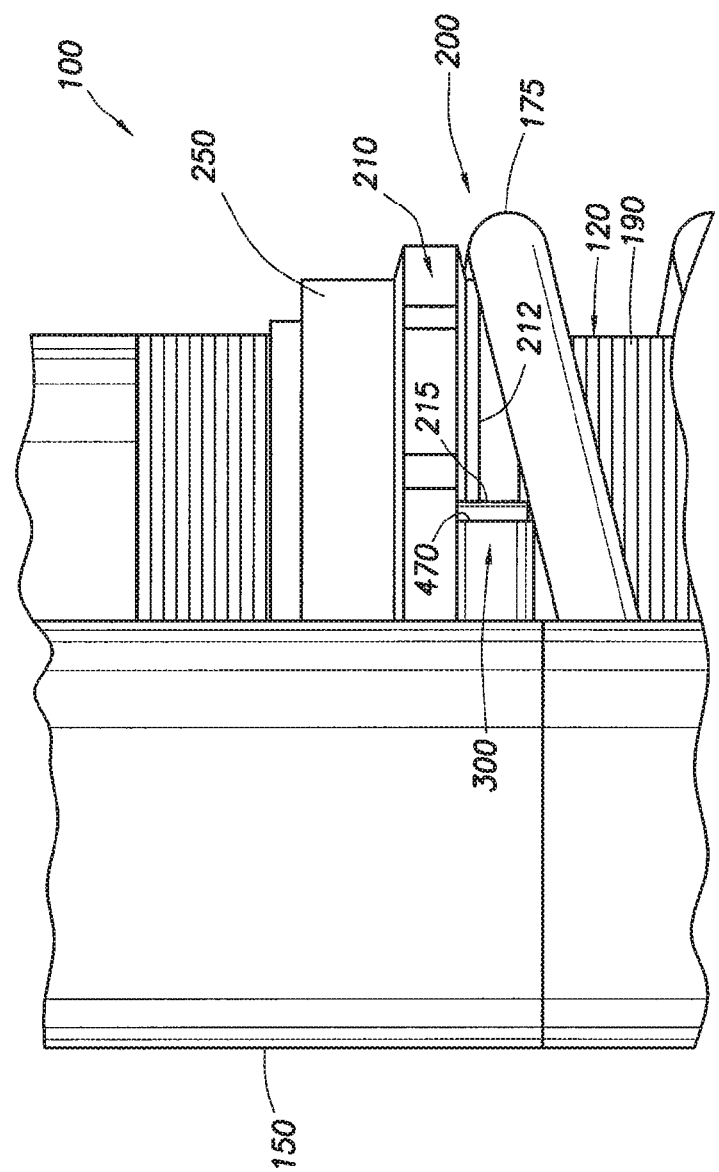
FIG. 3 is an enlarged view showing an interface between the clamp, follower nut and spring.
Figure 4:
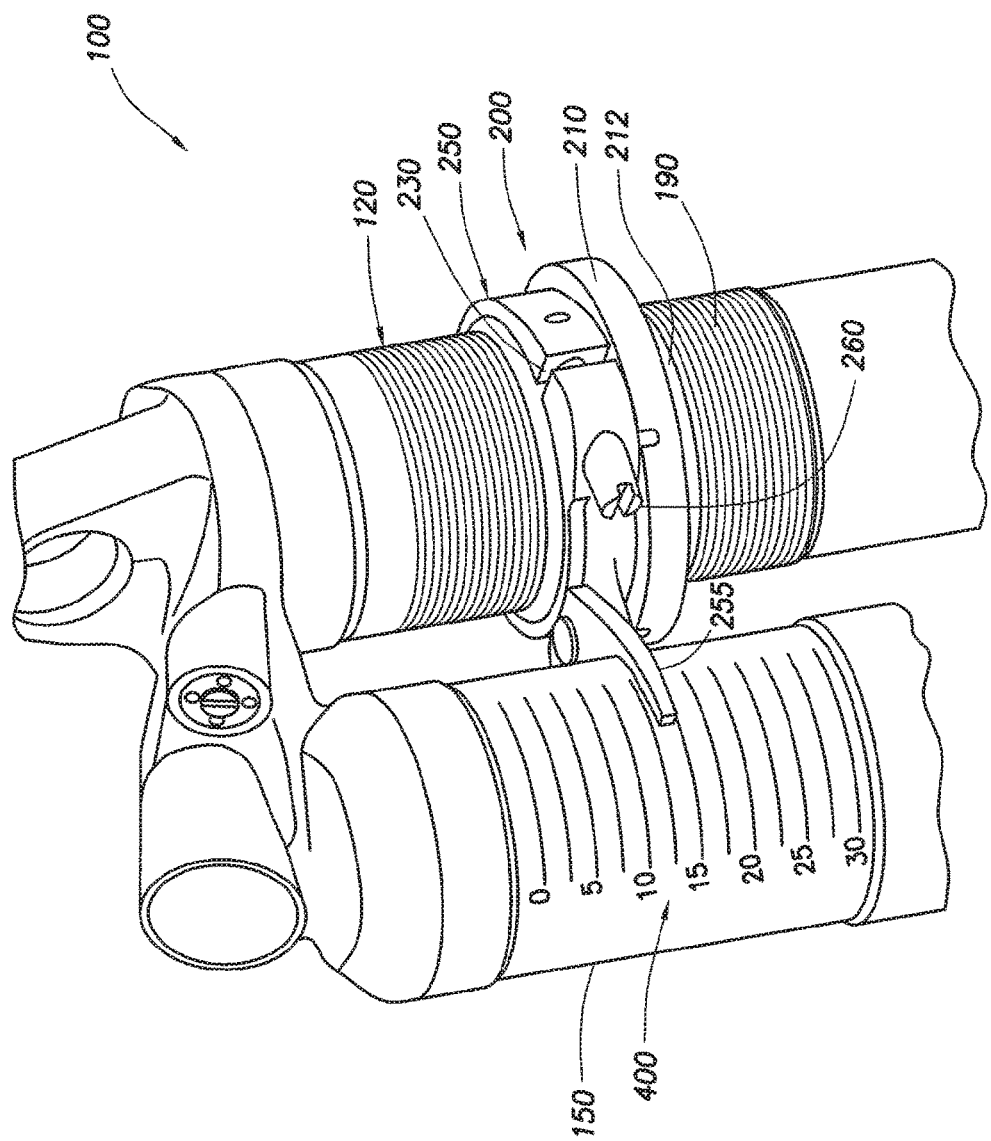
FIG. 4 is a perspective detailed view of the shock absorber.

FIGS. 2 and 2A show details of embodiments of the clamp 250 and follower nut 210. In one embodiment the follower nut 210 is cylindrical (with varying diameters along its length) generally with a cut though or split 220, giving it the form of a "C" ring. The clamp 250 is also in the form of a "C" ring, being generally cylindrical and having its own cut or split 230. As can be seen in FIG. 2A, the clamp 250 fits over the follower nut 210. In one embodiment the clamp 250 is expanded elastically at the split 230 to clear a lip 212 at a smaller-diameter end of the follower nut. Once the clamp 250 has cleared the lip, it is returned to a "relaxed" state surrounding a portion of the nut 210 and is rotationally movable relative thereto. The clamp 250 may then rotate about the follower nut 210 (and the follower nut 110 may rotate within the clamp 250) but the clamp 250 is retained axially on the follower nut 210 by lip 212. In one embodiment a screw 260, with a suitable washer is inserted into the clamp 250 but not tightened until such time as rotational and axial retention of the follower nut 210 on the damper body 120 (e.g. because spring adjustment is complete) is desired. In one embodiment, the adjuster assembly 200, with its nut 210 and clamp 250, is threaded onto threads 190 of body 120, and is moved axially (e.g. by rotation of the threaded (211) nut 210 about threads 190) until an indicator 255 (best seen in FIGS. 2 and 4) formed on the clamp 250 is located adjacent the reservoir 150. In one embodiment a curved surface 256 of the indicator 255, corresponding generally to the curved shape of the reservoir body is aligned with the exterior of the reservoir 150 and the follower nut 210 and clamp 250 may be axially translated further toward a lower end of the shock 100 by rotation of follower nut 210 (while clamp 250 remains aligned with reservoir 150 via indicator 255). Tightening the screw 260 "closes" the C-shaped clamp 250 and correspondingly closes the follower nut 210 thereby preventing the follower nut 210 from rotating on the threaded surface 190 of the damper body 120, and therefore frictionally (e.g. as a clamp) locking the nut 210 to the damper body and thus retaining the user-adjusted compression in the spring 175.

In one embodiment the indicator 255 connected on clamp 250, and rotationally fixed relative to the clamp 250, serves at least two purposes. Its curved surface 256 conforms to a portion of an exterior of the reservoir 150, thereby preventing rotation of the clamp 250 during rotation of the spring 175. As such the orientation of screw 260 is maintained relative to the shock absorber and the vehicle on which the shock absorber is mounted. Correspondingly, the screw 260 is maintained in an accessible location for tightening and loosening to facilitate spring 175 adjustment while the shock absorber remains mounted on the vehicle. Second, the indicator 255 serves to indicate axial compression state of the spring 175 relative to a scale 400 (referring to FIG. 4).

In one example, the clamp 250 is loosened by inserting an appropriate hex or blade type wrench or screw driver (not shown) through a predetermined shock absorber access space available in the vehicle (vehicle such as a monoshock rear shock motorcycle) and rotating screw 260 counterclockwise (assuming a right hand thread screw 260) to loosen the clamp. Once the clamp 250 is loose, the spring 175 can be manually gripped, through the access space, by a user and rotated manually, for example, in one embodiment having right hand threads 190 from the top axial view of the shock absorber, clockwise as viewed from the upper end, to increase compression or pre-load in the spring 175. In that embodiment rotating the spring 175 counterclockwise as viewed from above reduces pre-load of the spring 175 (or vice versa depending on the sense of threads 190). As previously described, such rotation of the spring 175 causes rotation of the follower nut 210 and corresponding axial translation of the follower nut 210 (based on the pitch of the threads 190) relative to the damper body 120 and along threads 190. Axial movement of the follower nut 210, relative to non-axially moving bottom clip 180, increases or decreases compression pre-load in spring 175. In one embodiment, when the desired pre-load is obtained, as indicated by movement of the indicator 255, which moves axially with the nut 210, relative to the scale 400, the clamp 250 is retightened by rotating screw 260 clockwise. It should be noted that the scale 400 may be placed on any suitable and axially static component relative to the follower nut 210/clamp 250 and the indicator 255 may be structured to "point" appropriately thereto. In one embodiment the numerical markers on the scale 400 are indicative of a percentage of compression preload in the spring. In one embodiment, the scale and indicator are visible from an exterior of an assembled vehicle with the shock absorber having the scale and indictor mounted thereon. In one embodiment, the scale 400 and indicator 255 "pair" comprise a longitudinal wire coil and permanent magnet. Position of the magnet relative to the coil is indicated by a state of current through the coil and can be calibrated to correspond to a state of spring compression. In one embodiment the "scale/indicator" pair comprises a proximity sensor and a datum structure. In one embodiment an electronic "scale/indicator" pair is connected to a transmission circuit having wireless protocol capabilities, such as Garmin's ANT plus, and shock spring compression data is transmitted in real time or in packets to a user interface/output device such as for example Garmin's 705 edge GPS enabled computer. In one embodiment the shock absorber is a monoshock and is accessible and visible, while mounted in a functional position, through a limited access space of the monoshock equipped vehicle.

While the foregoing is directed to certain embodiments of the present invention, other and further embodiments of the invention may be devised without departing from the basic scope thereof, and the scope thereof is determined by the claims that follow.

What we claim is:

1. A suspension system comprising:
   a cylindrical body having a threaded portion;
   a spring coaxially disposed around said cylindrical body;
   an adjuster assembly disposed coaxially around said cylindrical body and coupled to said spring;
   a follower nut disposed coaxially around said cylindrical body and coupled to said adjuster assembly, said follower nut disposed in threaded engagement with said threaded portion of said cylindrical body and abutting an end of said spring, said follower nut constructed and arranged to affect compression of said spring while said follower nut translates axially along said threaded portion of said cylindrical body, wherein an axial position of said follower nut is indicated relative to a piggyback reservoir operable with a damper; and
   a visual indicator and a scale coupled with said piggyback reservoir, said visual indicator and said scale operable to indicate an amount of compression of said spring, said visual indicator and said scale together comprising:
   a longitudinal wire coil;
   a permanent magnet; and
   wherein said position of said permanent magnet relative to said longitudinal wire coil is indicated by a state of current through said longitudinal wire coil.

* * * * *